United States Patent Office 2,751,539
Patented June 19, 1956

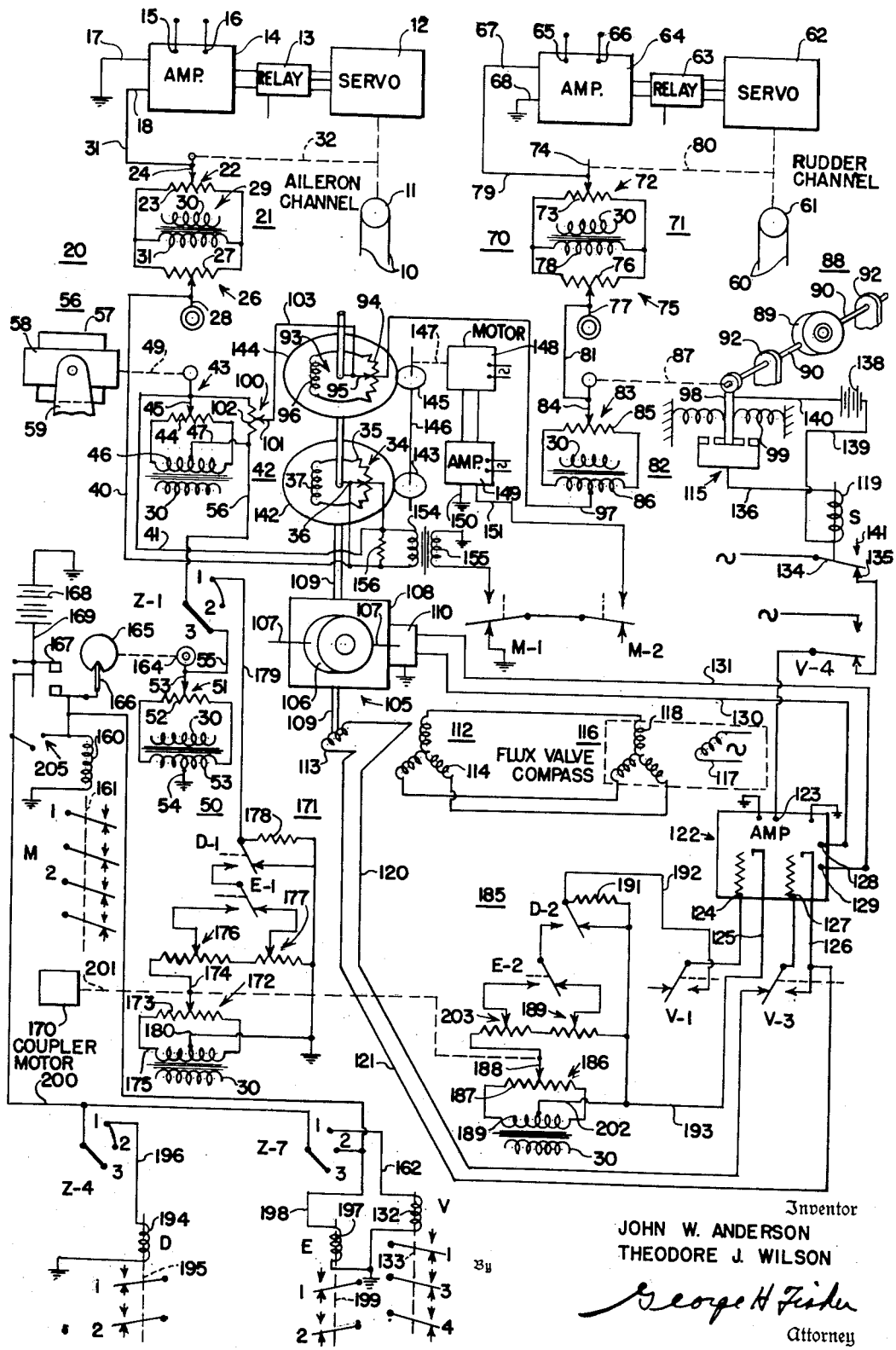

2,751,539

AIRCRAFT CONTROL APPARATUS

John W. Anderson and Theodore J. Wilson, Minneapolis, Minn., assignors to Minneapolis-Honeywell Regulator Company, Minneapolis, Minn., a corporation of Delaware Application February 17, 1950, Serial No. 144,832

6 Claims. (Cl. 318—489)

This invention pertains to steering mechanism for a dirigible craft and more particularly involves the control of an aircraft. As such, the invention may be considered an improvement in devices commonly known as automatic pilots.

It is an object of this invention to provide an automatic steering mechanism for an aircraft wherein a device having directional stability is slaved to a compass responsive to the earth's magnetic field so that said device may be maintained in a particular direction related to the magnetic field. When thus slaved, the device is further adapted to automatically control the aircraft on a selected course or in selected direction. Additionally the device having directional stability may be alternatively controlled by radio signals emitted by a ground station in order that the cousre of the aircraft may follow a predetermined ground path.

It is a further object of this invention to directly control the course of the aircraft from said radio signals when initial alignment with the ground track is being made while maintaining said slaved directionally stable device in a null condition and after said initial alignment utilizing said radio signals to directly control the course of the aircraft and also transferring control of said directionally stable device from said compass to said radio signals and utilizing said device to control said aircraft to compensate for any effects such as a cross wind tending to carry the craft off of the ground track.

It is a further object of this invention to provide a directionally stable device, slaved to a magnetic compass, with a signal generator for stabilizing the course of the aircraft which generator is maintained in a null condition during changes in course of the aircraft which are selected by the pilot of the aircraft or during changes in course effected in response to the aforesaid radio signals defining a predetermined ground track.

A further object of this invention is to automatically steer an aircraft from a directional gyroscope which either may be slaved to a compass with provisions for discontinuing said slaving relationship during aircraft changes in heading or controlled by signals derived in accordance with the displacement or said craft from a radio-defined ground track.

A further object of this invention is to control a precession motor for a directional gyroscope through an electronic amplifier alternatively controlled by signals of one frequency or double such frequency.

Other objects and advantages of the invention to those skilled in the art will become apparent upon consideration of the following description in conjunction with the attached drawing disclosing a preferred embodiment of the invention.

The sole figure comprising the drawing is a schematic illustration of the invention for automatically controlling the flight of an aircraft.

The apparatus which embodies the invention is adapted to stabilize the aircraft on a given heading or, in response to radio signals emitted from a ground station, follow a predetermined ground track. The ground track is defined by a known system providing overlapping waves of different frequency wherein the ground track is a path formed from equipotential signals from both frequencies. The characteristics of the waves of different frequency and the ground track is more fully disclosed in Technical Development Reports 35 and 55 of the Civil Aeronautics Administration, published in October 1943 and June 1947 respectively.

Since the course of the aircraft is to be controlled, operation of the ailerons and rudder of the aircraft (the course governing means) is provided.

Referring to the drawing, the ailerons (not shown) are operated by cables 10 extending from a cable drum 11. The cable drum 11 is driven by an aileron servomotor 12. The aileron servomotor 12 is reversibly controlled from an aileron amplifier 14 through an aileron engage relay 13. The aileron amplifier 14 is provided with power input terminals 15 and 16 and is also provided with signal input terminals 17, 18. The amplifier 14 is of the type wherein the direction of rotation of the servomotor 12 depends upon the phase relationship between the input signal across terminals 17, 18 with respect to the voltage across the power input terminals 15, 16. The amplifier-servomotor combination may be of the type disclosed in the patent to W. H. Gille et al. 2,425,733.

A control circuit connected to the signal input terminals for the amplifier 14 consists of a balanceable impedance network 20 which incluudes a plurality of signal generators connected in series in order to effect a resultant signal which is the algebraic sum of all the various signals of the separate generating devices. The first signal generating device is a servomotor followup-manual trim impedance network 21. The impedance network 21 consists of a follow-up potentiometer 22, a manual trim potentiometer 26, and a transformer 29. Potentiometer 22 includes a resistor 23 which is connected across the ends of secondary winding 31 of transformer 29 which has a primary winding 30. Potentiometer 22 includes a slider 24 which is connected by lead 31 to input terminal 18 of amplifier 14. The slider 24 is driven from the servomotor 12 through an operating connection 32. Potentiometer 26 includes a resistor 27 which is connected across the ends of secondary winding 31 in parallel with resistor 23. A slider 28 of potentiometer 26 may be manually adjusted. It may be seen that the impedance network 21 is in the form of a resistance bridge with the sliders 24 and 28 representing one diagonal of the bridge or the output members. Normally the sliders 24 and 28 are at the mid points of their respective resistors where there is no potential across the sliders. The output of this impedance network 21 depends upon the relaive displacements of the two sliders, If the slider 28 be held at the mid point of resistor 27 the potential between sliders 28 and 24 changes in phase as slider 24 is moved from one side of the center of resistor 23 to the other side. The magnitude of the signal depends upon the distance which slider 24 is moved from the center of resistor 23 while slider 28 thus remains held.

The next signal generator is a directional gyro aileron potentiometer 34 having a resistor 35 and a slider 36. The resistor 35 is connected across the ends of the secondary winding 37 of a transformer having a primary winding 30 which for purpose of simplicity of illustration is not shown adjacent secondary winding 37. Since a transformer may have a single primary winding supplying a plurality of secondary windings, in the present arrangement it is proposed to utilize a common primary winding for the several secondary windings indicated. The slider 36 is stabilized from a directional gyroscope to be described. A lead wire 40 extends from the slider 28 of potentiometer 26 to slider 36 and a lead wire 41 extends from a center tap of resistor 35 to an output member of a signal generator 42.

The signal generator 42 includes a vertical gyro roll potentiometer 43 having a slider 45 and a resistor 44 which is connected across the ends of a secondary winding 46 of a transformer having a primary winding 30. The winding 46 has a center tap lead 47. The slider 45 is normally at the center of resistor 44 when its potential is the same as the center tap lead 47 of winding 46. The wiper and the center tap represent the output members of the network. The slider 45 is connected to the lead 41 leading as stated to a center tap of resistor 35 of the directional gyro aileron potentiometer 34.

The impedance network 20 includes a manual signal generator 50 comprising a manual turn control potentiometer 51 having a slider 53 and a resistor 52 which is connected across the ends of a secondary winding 53. The secondary winding 53 is supplied from a primary winding 30. A center tap 54 of secondary winding 53 is connected to ground.

Between the impedance network 42 and the signal generator 50 there is a section Z-1 of a rotatable contactor having a plurality of like sections. Each section like section Z-1 includes a plurality of spaced contacts with a coacting rotatable contactor. The contacts in section Z-1 have been given corresponding numbers 1, 2, and 3 to represent the three positions in which the contactor may be placed. The #1 and #2 position contacts of selector Z-1, section are connected together whereas the #3 contact is independent. A lead wire 55 extends from slider 53 of the turn control potentiometer 51 to the #3 contact of section Z-1. From the contactor of section Z-1 a lead wire 56 extends to the center tap lead 47 of secondary winding 46. It is now evident that there has been recited a balanceable control circuit extending from input terminal 18 of aileron amplifier 14 and including the network 21, signal generator 34, network 42, and network 50.

The apparatus for operating the rudder of the aircraft will now be described. The rudder (not shown) is operated by cables 60 from a cable drum 61. The cable drum is driven from a rudder servomotor 62. The rudder servomotor 62 is reversibly controlled from a rudder amplifier 64 through a rudder engage relay 63. The rudder amplifier 64 includes power input terminals 65, 66 and control signal circuit input terminals 67, 68. The rudder amplifier rudder servomotor combination may be similar to the aileron amplifier-aileron servomotor combination.

The rudder engage relay 63 like the aileron engage relay 13 has a plurality of contacts. When an engage relay is energized one pair of contacts permits the energization of the brake solenoid for the servomotor, another pair of contacts permits the amplifier through a first amplifier relay to energize one clutch solenoid whereby the servomotor may be rotated in one direction and another pair of contacts of the relay permits the amplifier through a second amplifier relay to energize the other clutch solenoid for obtaining opposite direction of rotation of the servomotor. The arrangement of the engage relay is similar to that disclosed in the aforesaid Patent 2,425,733 or as in the application of Willis H. Gille, Serial No. 447,989, filed June 22, 1942.

Continuing with the amplifier 64, a control circuit for the amplifier consists of a balanceable impedance network 70 comprising individual variable impedances or signal generators 71, 82, 93, 100, and 50. The variable impedance 71 comprises a servo followup potentiometer 72 having a resistor 73 and a slider 74; a manually operable trim potentiometer 75 having a resistor 76 and a slider 77; and a transformer having a secondary winding 78 and a primary winding 30. Resistors 73 and 78 are connected in parallel across the ends of secondary winding 78. Slider 74 is adjusted from the rudder servomotor 62 through a followup connection 80. A lead 79 extends from slider 74 to the input terminal 67 of amplifier 64. Slider 77 as stated is manually adjustable. The network 71 resembles a Wheatstone bridge with the sliders 77 and 74 representing the ends of one diagonal of the bridge with the secondary winding 78 connected to the ends of the other diagonal of the bridge.

Network 82 consists of a yaw rate gyro potentiometer 83 having a slider 84 and a resistor 85 which is connected across the ends of a secondary winding 86 of a transformer having a primary winding 30. A lead wire 81 extends from the slider 77 of the trim potentiometer 75 to the slider of the rate gyro potentiometer 83. The slider 84 is adjusted from a yaw rate gyroscope 88 through a suitable operating connection 87.

The rate gyroscope 88 is of the type well known in the art and for purpose of illustration is shown as comprising a casing 89 which supports therein the rotor of the gyroscope which spins or rotates about a horizontal axis. At right angles to this spin axis the casing 89 is supported by trunnions 90 in pedestal bearings 92. One trunnion carries an extension upon which is mounted an arm 98. Centering springs 99 have one end fastened to the arm and the free end connected to any suitable supporting means whereby the arm 98 is biased to a normal position. The gyroscope is so mounted on the aircraft that upon movement of the aircraft about the yaw or turn axis, the gyro precesses about the axis of trunnions 90 and thereby through the connection 87 displaces slider 84 in proportion to the rate of turn of the aircraft.

Network 70 includes a directional gyro rudder potentiometer 93 having a resistor 94 connected across the ends of a secondary winding 96 of a transformer having a primary winding 30 (not shown) adjacent thereto. A slider 95 of the rudder potentiometer is stabilized from the directional gyroscope. A lead wire 97 extends from a center tap of resistor 94 to a center tap of secondary winding 86 in network 82.

Network 70 includes a voltage dividing potentiometer 100 associated with the network 42. The potentiometer includes a manually adjustable slider 101 and a resistor 102. One end of resistor 102 is connected to slider 45 of potentiometer 43 and the other end is connected to the center tap lead 47 of secondary winding 46. A lead wire 103 extends from the manually adjustable slider 101 to the slider 95 of the directional gyro rudder potentiometer 93.

The remaining portion of network 70 includes the turn control network 50 by reason of the lead 56 extending from the lower end of resistor 102 and through the Z-1 selector section to the slider 53 of the turn control potentiometer 51.

In order to stabilize the aircraft on a desired course or in a desired direction a directional gyroscope 105 is provided. This directional gyroscope includes a casing 106 which supports therein the rotor of the directional gyroscope for rotation about a horizontal axis. The casing 106 is supported by trunnions 107 in a vertical gimbal ring 108 the axis of the trunnions being at right angles to the axis of the rotor. The outer gimbal ring 108 is supported for rotation about a vertical axis by trunnions 109 which are rotatable in bearings not shown. The upper trunnion 109 is extended a sufficient distance to support the slider 36 of the directional gyro aileron potentiometer 34 and the slider 95 of the directional gyro rudder potentiometer 93. It will thus be apparent that upon the aircraft's changing its direction of flight by rotation about the vertical or turn axis of said craft the resistors 35 and 94 will move with respect to the gyro stabilized sliders 36 and 95 of the aileron and rudder directional gyro potentiometers to generate stabilizing signals.

The directional gyroscope 105 is provided with a precessing or torque applying motor 110 for effecting rotation of the gyroscope about the axis of trunnions 109. This precession motor 110 may take the form of a capacitor type reversible induction motor energized from a single phase source. The rotor of the induction motor may be carried by one trunnion 107 of the gyro casing 106. The stator of the induction motor may be supported by the outer gimbal ring 108 and it will thus be apparent that when the stator windings are energized in one manner or the opposite the action of the rotating field of the stator applies a torque in one direction or the opposite to the rotor carried by the trunnion 107. This torque about the axis of trunnions 107, 107 has the effect of causing the gyroscope 105 to precess as a unit about the axis of trunnions 109, 109 as commonly known.

The gyroscope 105 has its precession motor 110 energized in one instance to effect slaving of the gyroscope 105 to a magnetic compass. Alternatively the precession motor 110 may be energized in response to radio signals in accordance with the deviation of the aircraft from a selected ground track. The slaving arrangement will be considered first. The lower trunnion 109 of directional gyroscope 105 carries a rotor winding 113 of a control transformer or resolver 112. The control transformer 112 has, as conventional, a three-phase stator winding 114. The three stator windings are connected to corresponding stator windings 118 of a compass transmitter 116. The compass transmitter 116 is a conventional "flux valve" compass whose three-phase stator winding 118 is energized from an exciting winding 117. The winding 117 is connected to a 400 cycle source of alternating current. The "flux valve" compass may be of the type disclosed in the patent to Esval et al. 2,357,319, dated September 5, 1944.

As is well known, the voltage developed in the stator windings 118 of compass 116 depends upon the relative position of these windings with respect to the earth's magnetic field. The voltage from the compass windings 118 are applied to the stator windings of control transformer 112 and by transformer action to the rotor winding 113 of the control transformer. The winding 113 may be rotated with respect to its stator until there is no voltage developed therein. To this end, the voltage developed in winding 113 is used in a manner to be described to control the energization of precession motor 110 whereby the directional gyro 105 is rotated until no signal is developed in winding 113 which results in aligning or slaving the gyroscope to the compass in the manner following. The precession motor 110 is energized from a 400 cycle frequency source whereas the voltage developed in winding 113 is of 800 cycle frequency. It is desirable to control the direction in which torque is applied by the motor 110 by means of a discriminator form of amplifier which operates on the phase relationship between the power input voltage, which is of the same frequency as that supplied to motor 110, and the control signal from the winding 113. In order that the 800 cycle control signal properly control the application of 400 cycle frequency to the precession motor 110, a satisfactory amplifier is required. One form of amplifier suitable for this control is that disclosed in the application of Robert R. Chapman Serial No. 83,166, filed March 24, 1949. Such form of amplifier is generally characterized in this illustration of the invention by the reference numeral 122. Since the amplifier is to be also controlled by a 400 cycle control signal additional provision must be included. The compass amplifier 122 has a power input terminal 123 which may be connected to a 400 cycle frequency source of voltage; an 800 cycle pair of control electrode terminals 126, 127 and a 400 cycle pair of control electrode terminals 124, 125; and power output terminals 128, 129 which are connected by means of leads 130, 131 to the precession motor 110. When the control signal is of one phase, lead 130 is energized to cause precession motor 110 to apply torque in one direction; and when the control signal is of opposite phase, lead 131 is energized to cause precession motor 110 to apply torque in the opposite direction.

A relay V is involved in the alternative operation of the compass amplifier 122 from 400 or 800 cycle control signals. This relay V is separately shown and as indicated consists of an operating winding 132 and a coacting plunger 133. The relay V includes two control sections V-1, V-3, and V-4. Each section consists of a pair of opposed contacts and a coacting arm operated by the plunger 133.

One end of rotor winding 113 of control transformer 112 is connected by means of lead 120 to an out contact of section V-3 and thence through the coacting relay arm to the control electrode 127 of amplifier 122. The opposite end of winding 113 is connected by lead 121 directly to the control electrode 126 of amplifier 122. The control electrode 125 is connected to one side of an additional source of 400 cycle control voltage to be described and the other control electrode 124 is connected to the relay arm in section V-1 which normally engages an idle out contact. The opposed contact of section V-1 is connected to the opposite side of the additional source of control voltage.

It is thus seen that when the relay V is unenergized as illustrated the amplifier 122 is controlled from the voltage generated in the winding 113 of the control transformer 112 and gyroscope slaving is attained.

The ungrounded power input terminal 123 of compass amplifier 122 is connected to two alternative sources of 400 cycle voltage. One source of 400 cycle voltage is connected to power input terminal 123 directly from an in contact of section V-4 of the relay V for a purpose to be described whereas the other source of 400 cycle frequency voltage is connected through the terminal 123 through the relay arm of the V-4 section of relay V and an out contact and through another set of relay contacts to be described.

As has been stated, the directional gyroscope 105 is slaved to the flux valve compass 116 through the compass amplifier 122 and the precession motor 110. In order to prevent the application of northerly turning error from the flux valve compass 116 to the directional gyroscope during banked turns of the aircraft, the directional gyroscope is permitted to be unslaved during such turn. The gyro may be unslaved by opening the circuit to the power input terminal 123 of amplifier 122 during turns. In the present embodiment of the invention this opening of the circuit is automatically secured by means of the rate gyroscope 88 which as stated is responsive to turning of the aircraft about the vertical axis. The arm 98 of the rate gyroscope which is carried in insulated relation on the axis of trunnions 90 is connected by lead 140 to a source of voltage generally indicated as a battery 138. The arm 98 carries at its lower end and on opposite sides thereof contacts which engage respectively with two spaced contacts. The contacts carried by the arm and the spaced contacts constitute a switch 115. The spaced contacts are connected together and from their junction a lead 136 extends to one end of an operating coil 119 of a relay S. The opposite end of coil 119 is connected by lead 139 to the opposite terminal of battery 138. The relay S includes a relay arm 134 which coacts with an out contact 135 and an idle in contact 141. When the gyroscope 105 is slaved to the flux valve compass 116 the supply of 400 cycle voltage to the compass amplifier 122 is connected to the power input terminal 123 through relay arm 134 of the relay S and the out contact 135 and through the out contact of section V-4 of the relay and its relay arm to the terminal 123.

It will now be apparent that as the craft turns, the rate gyroscope 88 precesses about the axis of trunnions 90 whereby the arm 98 with its contacts may engage one or the other of the coacting spaced contacts and thus energize the coil 119 of the S relay. The S relay operates the relay arm 134 to open the supply of 400 cycle voltage to the power input terminal 123 and thus removes the excitation on the precession motor 110.

The structure with the relay V in the out position shown provides for the stabilization of the aircraft on a selected heading. In addition, the turn control potentiometer 51, operated manually, may be utilized to introduce changes in heading of the aircraft.

When manual changes in heading are introduced it is apparent that unless some arrangement is provided the directional gyro potentiometers 93 and 34 would oppose the tendency to change course manually. The arrangement for preventing the opposition to turning will now be described. The resistor 35 of the directional gyroscope aileron potentiometer 34 and its energizing winding 37 are carried in insulated relation by a gear 142. The gear 142 meshes with its driving gear 143. The resistor 94 of the directional gyroscope rudder potentiometer 93 and its energizing winding 96 are carried in insulated relation on a driven gear 144 which meshes with its driving gear 145. The gears 143 and 145 are fixed to a drive shaft 146. The shaft 146 in turn is driven from an output shaft 147 of an aligning motor 148.

The motor 148 may be a single phase capacitor type motor. The direction of rotation of motor 148 is controlled by an amplifier 149. The motor 148 and the amplifier 149 are connected to a source of 400 cycle frequency voltage. The output of the amplifier in turn is connected to the motor 148. The amplifier 149 has control electrode terminals 150, 151. The amplifier 149 may be of the discriminator type and the direction of rotation of motor 148 depends upon the phase of voltage across the terminals 150, 151 with respect to the voltage across the power input terminals of the amplifier.

The control signal for amplifier 149 is obtained from the directional gyro aileron potentiometer 34. To this purpose, the center tap of resistor 35 of potentiometer 34 is connected to one end of primary winding 154 of an isolating transformer 153. The slider 36 of potentiometer 34 is connected to the opposite end of primary winding 154. A resistor 156 is connected in parallel with the primary winding 154 to the center tap and slider respectively. The isolating transformer 153 has a secondary winding 155. One end of secondary winding 155 is connected to ground. The voltage generated in winding 155 is selectively applied to the amplifier 149 through contacts M-1, M-2 of a relay M. The relay M is separately shown and comprises an operating winding 160 and its coacting plunger 161 which operates the switch arms for a plurality of sections of this relay. Each section consists of a single relay arm and two opposed spaced contacts. Only the first and second sections of the M relay have been identified and are all that are required for the present disclosure.

Reverting to the secondary winding 155 of the isolating transformer 153, the opposite end of this winding 155 is connected to and in contact of the first section M-1 of the M relay. The relay arm of this section is normally in contact with a grounded out contact. The arm of the first section is connected to the arm of the second section M-2 of the M relay. The out contact of the second section is an idle contact. The in contact of this second section is connected to one control electrode terminal 151 of amplifier 149. The opposite electrode terminal 150 of amplifier 149 as stated is connected to ground and is thus common with the ground end of secondary winding 155 to complete the input circuit for the amplifier.

It will be evident that with the relay M energized the output of the directional gyro aileron potentiometer 34 is applied to the aligning motor amplifier 149 which causes the aligning motor 148 to rotate and through gears 143, 142 position the resistor 35 with respect to the slider 36 until there is no voltage applied to the transformer 153.

To provide for energization of the relay M during manual changes in course, the manual turn control knob 164 which positions slider 53 of the turn control potentiometer 51 also rotates a disk 165. The disk 165 has a notch therein which in normal position of the turn control knob 164 receives a follower 166. The follower 166 has a part thereof angularly disposed with respect to the portion engaging the disk. The angularly disposed portion is pivoted at a point midway between its ends. The free end supports a switch contact which coacts with a spaced contact 167. Upon rotation of the disk 165 due to the movement of the turn control knob 164 in either direction, the contact on the follower 166 is moved into engagement with the spaced contact 167. A lead 169 connects the contact 167 with a source of voltage indicated by battery 168 whose opposite terminals connect it to ground. Follower 166 in turn is connected to one end of operating winding 160 of the relay M. The opposite end of winding 160 is connected to ground.

Operation of the turn control knob 164 to introduce a signal from potentiometer 51 to effect change in course of the craft results also in the operation of the relay M whereby the signal from the directional gyro aileron potentiometer 34, due to the change in course, is applied to the motor 148 which causes the positioning of the resistor 35 until the center tap and the slider of the potentiometer 34 are adjacent one another.

The structure responsive to radio signals will now be considered. During such times as the airfield or landing field upon which it is desired to land a craft is "closed in" it may be desirable to automatically cause the aircraft to follow a predetermined path or ground track as defined by radio signals. This operation of the aircraft from radio signals is commonly known as a "blind landing" operation and the present invention is concerned with causing the aircraft to follow the known "localizer beam."

The aircraft will be provided with a suitable receiver for receiving radio signals of 90 and 150 cycle frequency. When the craft receiver receives equal potential signals from both frequencies, the aircraft is said to be "on the beam." The aircraft may be to the left or to the right of the "beam" depending upon the preponderance of the potential of the 90 cycle frequency signal or the 150 cycle signal. The output of this localizer receiver due to the displacement of the aircraft from the "beam" may be utilized to operate a motor. One arrangement for controlling the operation of the motor from "localizer" signals is disclosed in the patent to Moseley 2,423,337 dated July 1, 1947, or the arrangement may be such as disclosed in the application of Ross C. Alderson and Benjamin Carpenter, Serial #49,442, filed September 5, 1948. In this present embodiment of the invention a localizer receiver controlled coupler motor 170 rotates in one direction or another depending upon the displacement of the aircraft from the ground track as defined by the overlapping radio beams.

For introducing the radio signal controlled movements of coupler motor 170 to control the flight of the aircraft there has been provided a localizer variable impedance network 171 and a directional gyro precession motor network 185.

Associated with the impedance networks 171 and 185 are two network control relays D, E. The relay D comprises an operating coil 194 which actuates a plunger 195. The plunger 195 is adapted to move a plurality of relay arms D-1 and D-2 in several sections of the relay from an "out" position to an "in" position. Each section consists of two opposed contacts and its coacting contact arm. One end of operating coil 194 is connected to ground and the opposite end of the coil is connected by lead 196 to the number 1 position contact of selector section Z-4. The section Z-4 similar to section Z-1 comprises "1," "2" and "3" position contacts and an associated contactor arm adapted to selectively engage one of said contacts. The "1" and "2" position contacts are electrically connected.

The relay E is similar to the relay D and includes an operating winding 197 and a coacting plunger 199 which operates a plurality of relay contact arms E-1 and E-2. The relay is composed of two sections each section including one contact arm and two opposed contacts. One end of winding 197 is connected to ground and the opposite end is connected by lead 198 to the #2 position contact of section Z-7 of the Z selector. This Z-7 section similar to section Z-1 includes "1," "2," and "3" position contacts with a coacting contact arm. The end of lead 198 is also extended to the ungrounded end of coil 160 of the relay M. The contact arms of sections Z-4 and Z-7 are connected by lead 200 to the ungrounded side of battery 168.

An arrangement whereby the localizer receiver motor 170 controls the impedance networks 171 and 185 will now be described. The impedance network 171 includes a potentiometer 172 having a slider 174 and a resistor 173. The slider 174 is driven from the receiver motor 170 through an operating connection 201. The resistor 173 is connected across the ends of a secondary winding 175 of a transformer having a primary winding 30. A center tap 180 of secondary winding 175 is connected to ground. Two voltage dividing potentiometers 176 and 177 have their resistors connected in series and the free end of the resistor of potentiometer 176 is connected to slider 174 and the opposite end of the resistor of potentiometer 177 is connected to the grounded center tap 180. An adjustable tap of potentiometer 176 is connected to the in contact of section 1 of relay E. The adjustable tap of potentiometer 177 is connected to the out contact of section 1 of the relay E and the contact arm of section 1 of the E relay is connected to the in contact of section 1 of the D relay. The out contact of section 1 of the relay D is connected to the center tap 180. The contact arm of section 1 of the relay D normally engages its out contact and a protective resistor 178 is placed across the contact arm and the out contact. A lead 179 extends from the relay arm of section 1 of the relay D to the number 1 position contact of section Z-1. The Z-1 section includes as stated a 1, 2, and 3 position contact with the number 1 and 2 position contacts connected.

The impedance network 185 includes a potentiometer 186 having a resistor 187 and a slider 188. The slider 188 is adjusted by the localizer receiver control motor 170 through the operating connection 201. The resistor 187 is connected across the ends of secondary winding 189 of a transformer having a primary winding 30. The secondary winding 189 has a center tap 202 which is connected by lead 193 to control electrode terminal 125 of compass amplifier 122. Two voltage dividing potentiometers 188, 189 have their resistors connected in series and the free end of the resistor of potentiometer 188 is connected to the slider 188 of potentiometer 186. The opposite end of the resistor of potentiometer 189 is connected to the center tap 202 of winding 189. The slider of voltage divider 203 is connected to the in contact of section 2 of relay E. The slider of voltage divider 189 is connected to the out contact of section 2 of the relay E. The contact arm of section 2 of the relay E is connected to the in contact of section 2 of the D relay. The out contact of section 2 of the relay D is connected to the center tap 202 and is normally engaged by the contact arm of section 2. A protective resistor 191 is connected across the contact arm and out contact of the #2 section of the relay D. A lead 192 extends from the contact arm of section 2 in the relay D to the in contact of section 1 of the V relay.

A manually operable single pole single throw switch 205 having its switch arm connected to battery 168 and its terminal connected to the ungrounded end of coil 160 of the M relay completes the arrangement.

Operation

The operation of the apparatus will be considered in four aspects namely: course stabilization, manual changes in course, localizer beam bracketing, and localizer approach control.

As a preliminary it is considered that the sections Z-1, Z-4, and Z-7 of the manual selector are ganged for simultaneous operation. Preliminary to the application of course stabilization, the pilot may manually operate the control surfaces directly to bring the aircraft into a level position about the roll and pitch axes. The aircraft may then be brought on a desired heading. At this time the pilot may operate the two position switch 205 and energize coil 160 of the relay M. The first and second sections of the relay M permit the output of the directional gyro aileron potentiometer to be applied to the motor amplifier 149 which in turn operates the motor 145 to drive the directional gyro aileron and directional gyro rudder potentiometer resistors so that their center taps are adjacent their respective sliders at which time there will be no signal applied to the amplifier 149 and thus when the pilot changes to automatic stabilization there will be no residual signals in these potentiometers.

With the craft on the desired heading, the pilot opens the single throw switch 205 to deenergize the relay M and thus disassociates the isolating transformer winding 155 from the amplifier 149. The various signal generators for deriving control signals are assumed to have their respective sliders at the electrical centers of their resistors. The aileron and rudder engage relays 13 and 63 are energized as disclosed in the aforesaid Gille application.

The manually operable Z selector is positioned so that the respective contact arms engage the #3 position contact.

Slaving action

If the directional gyro 105 is not properly aligned with respect to the flux valve compass 116, a voltage signal is built up in rotor winding 113 of control transformer 112 and this control signal will be applied to the compass amplifier control electrode terminals 126, 127. Control electrode terminal 126 corresponds to the connection to cathode 24 and connection 127 corresponds to connection 22 of the aforesaid application of Robert R. Chapman. This signal from the winding 113 results in operation of the compass amplifier 122 whose output is applied by leads 130 and 131 to the precession motor 110. The gyro is precessed until there is no voltage developed in winding 113 when the directional gyro is thus properly aligned with the compass.

Stabilized flight

If the craft deviates from the heading to be maintained by the directional gyroscope 105, the resistors 35 and 94 of the directional gyro aileron potentiometers 34 and 93 move with respect to their gyroscope stabilized sliders 36 and 95 whereby a difference of potential is developed between the slider 36 and the center tap of resistor 35 on the one hand and the slider 95 and the center tap of resistor 94 on the other hand. The signal from the aileron potentiometer 34 is applied by lead 40 extending from slider 36 and lead 41 extending from the center tap of resistor 35 to the aileron network resulting in an unbalance of the aileron network. This unbalance of the aileron network causes the amplifier 14 to operate. The output of the aileron amplifier 14 is applied through the engaged or energized aileron relay 13 to the servomotor 12 which operates the aileron servomotor 11 to position the ailerons. The servomotor 12 also drives through its follow up connection the balancing potentiometer slider 24. The signal from the directional gyro rudder potentiometer 93 is applied by lead 103 connected to slider 95 and lead 97 connected to the center tap of resistor 94 to the rudder amplifier impedance network resulting in the unbalance thereof. The unbalance of this network effects operation of the rudder amplifier 64 which through the energized rudder engage relay 63 causes the operation of the rudder servomotor 62 and the positioning of the rudder. The rudder servomotor rebalances the network by operating the slider of the follow up potentiometer 72.

The craft due to the applied aileron and rudder moves in a banked turn toward the stabilized heading. The vertical gyro 56, due to the bank, operates the slider 45 of the vertical gyro roll potentiometer 43. The full signal from the roll potentiometer 43 is applied to the aileron network to cause opposite unbalance of the aileron network 20 resulting in the movement of the ailerons back toward normal position and rebalance of the network 20. The voltage divider 100 with its tap 101 applies a selected portion of the vertical gyro roll signal to the rudder network to oppositely unbalance rudder network 70 to cause returning of the rudder toward normal position and rebalance of network 70.

As the craft approaches the desired heading, the change in signals from the directional gyro potentiometer 34 and 93 causes further opposite unbalance in the rudder and aileron networks to cause the control surfaces to be moved in an opposite direction from their original position resulting in a decrease in the amount of bank of the craft and decrease in bank potentiometer signals so that the craft is substantially in level position and headed in the desired direction when the stabilized course is attained.

Manual turn control turns

To change the direction in which the aircraft is flying, the pilot operates through his turn control knob 164, the turn control potentiometer 51. The full turn control signal is applied to the aileron and rudder amplifier control circuits. Operation of the knob 164 rotates disk 165 resulting in energization of the relay M. The closing of the relay M connects the isolating transformer secondary winding 155 to the amplifier 149. As the craft changes heading due to the turn control signal, any tendency for the directional gyro aileron potentiometer to develop a signal results merely in the operation of the motor 148 which drives the resistors of the aileron and rudder potentiometers so that their center taps are in correspondence with their respective sliders to maintain them in no signal condition. When the desired course is approached, the pilot moves the control knob 164 toward its normal position and the follower 166 of disk 165 enters the notch of the disk and the circuit to the relay M, coil 160 is broken whereby the relay M is deenergized. With the relay M deenergized, the secondary winding 155 of isolating transformer 153 is disconnected from the aligning motor amplifier 149. The ailerons and rudder are moved to decrease the bank and turning rate of the craft as the control knob is returned.

During such change in course, the rate gyroscope responds to the rate of turn of the aircraft and in addition to operating the slider 84 of the rate gyro potentiometer 83 also closes the circuit for energizing the relay S. The operation of the relay S opens the circuit from the 400 cycle source to the compass amplifier power terminal 123 whereby power for energizing the precession motor 110 is withheld.

Localizer beam bracketing

As a preliminary to this form of control, the Z selector is moved so that its contact arms engage their respective #2 position contacts. It will be apparent that the M relay and the E relay are energized through the section Z-7 with the selector in the #2 position. Also the D relay is energized through the #2 position of section Z-4 of the Z selector. As before, the operation of the M relay causes any signal developed in the directional gyro aileron potentiometer 34 to be applied to the aligning motor 149 which causes its motor 148 to reposition the resistors of the directional gyro aileron and rudder potentiometers to a no signal position.

During localizer bracketing, it is assumed that the aircraft has not attained the desired ground track required to make a proper landing. In other words, the aircraft is approaching the localizer beam. The localizer receiver motor 170 moves the sliders 174 and 188 in proportion to the deviation of the aircraft from the desired ground path. The operation of the D and E relays causes the output of potentiometer 172 due to the motor operation to be applied to the #1 position contact and then to the #2 position contact of section Z-1 and thence to the aileron and rudder amplifier control circuits. The localizer signal thus effects operation of the aileron and rudder servomotors which move their control surfaces to change the course of the aircraft to lessen the localizer signal.

At this time, while impedance network 185 develops a control signal due to the displacement of slider 188 this signal is not utilized. Under the control of the localizer receiver signal as derived from network 171, the aircraft is caused to change its direction of flight until it is substantially aligned with the ground path or localizer beam.

Localizer approach control

During approach control, the Z-selector is moved to the #1 position. In the #1 position the relay M is unenergized. The relay V is energized from the #1 position of the Z-7 selector. The relay E is unenergized but the D relay remains energized through the #1 position contact of section Z-4. The operation of the relay V causes the power input terminal 123 of compass amplifier 122 to be connected through and in contact of the relay and relay arm V-4 to an auxiliary source of 400 cycle frequency voltage which connection is unaffected by turning of the aircraft if subsequently imposed. The control circuit for compass amplifier 122 from control transformer winding 113 is open at the out contact of section 3 of the V relay. The control circuit for compass amplifier 122 receives its input at this time from network 185. One output lead 192 of network 185 is connected to the in contact of section 1 of the V relay whose contact arm is connected to control electrode terminal 124. The other output lead 193 of network 185 is connected directly to control electrode terminal 125 of compass amplifier 122.

The electrode terminal 124 corresponds with the electrode terminal 183 and the electrode terminal 125 corresponds with the electrode terminal 187 of the aforesaid application of Robert R. Chapman.

With the E relay unenergized, it is apparent that a lower value of the voltage developed by potentiometers 172 and 136 will be applied to the aileron and rudder impedance networks for amplifiers 14 and 64 and the compass amplifier 122.

With the aircraft bracketing the beam, any movement of the aircraft thereafter to displace it from the localizer beam results in the operation of the motor 170. This operation of the motor 170 to adjust potentiometer 172 results in control signals being applied to the aileron and rudder changes to bring the aircraft back toward the desired ground track.

If the aircraft is subject to a cross wind or similar effect tending to laterally displace the craft with respect to the ground track, it is apparent that the craft due to the cross wind will tend to be continuously displaced from this ground track since the only way in which a signal can be derived from network 172 to oppose the displacing effect is for there to be some displacement from the beam. The purpose of applying the signal from the radio controlled network 185 to effect precession of the gyroscope will now become evident. With the gyroscope 105 precessed under control of network 185, as the cross wind carries the craft laterally from the ground track, the gyroscope is precessed so that the sliders 36 and 95 of the aileron and rudder directional gyro potentiometers are displaced up wind from the center taps of their respective resistors. This results in the direction of heading or attitude of the plane being maintained up wind with respect to the desired ground track and not parallel thereto. This up wind attitude of the aircraft causes it to have a lateral component of motion equal but opposite to that of the motion of the aircraft due to the cross wind consequently the aircraft is maintained in a resultant movement along the desired ground track despite its angular attitude with respect thereto. The aircraft therefore follows the "localizer beam" or predetermined ground track despite the action on the aircraft of a cross wind of similar effect tending to permanently displace the craft from the beam.

It will now be appreciated, that there has been provided a novel automatic control apparatus for an aircraft in which a directional gyroscope is slaved to a magnetic compass and wherein during selected changes in craft heading said gyroscope may be rendered ineffective as a control element of said apparatus. Further, this gyroscope may be controlled by said compass or by radio signals and functions during control of the aircraft from radio signals to compensate for the effects of cross wind tending continuously to displace the aircraft from a ground track defined by said radio signals.

Since the above disclosure may suggest various forms that the invention may assume, it is desired not to be confined to the particular embodiment disclosed but as defined by the appended claims.

I claim as my invention:

1. Apparatus for stabilizing the heading of an aircraft and for changing the heading thereof, said apparatus comprising: voltage responsive servo means for controlling the course of said craft; a directional gyroscope having precessing means; a voltage producing means operated by said gyroscope; a follow-up voltage producing means driven by said servo means; means for combining said voltages and connected to said servo means, to maintain the heading of the craft; a pair of means for producing voltages in accordance with the deviations of said craft from a predetermined ground path defined by radio beams; selector means for connecting one aircraft ground path deviation voltage producer directly with said combining means; selector means for operating said precessing means from the other ground path deviation voltage producer; and means effective as said selector moves from a position where said gyroscope precessing means is operated by said ground track signal producer to such position where said precessing means is not so operated to cause the gyroscope operated signal producer to be placed in no voltage condition.

2. Steering apparatus for an aircraft comprising: a gyroscope; a two part controller, one part being supported by said gyroscope, the other part by said aircraft, a second controller operated in accordance with the deviation of said aircraft from a ground track; servo means controlled by said two part controller to prevent change in heading of said craft; operable selective means for controlling said servo means from said second controller, to change the heading of said aircraft to bring said craft on the ground track; motor means controlled by said two part controller for rotating said aircraft supported part of said two part controller opposite to the direction of change in heading of said craft during operation of said selective means to prevent said two part controller from opposing said change in heading precessing means on said gyroscope; and means effective on alternative operation of said selective means for disconnecting said two part controller from the motor means and connecting it to the servo means and additionally connecting the second controller to the precessing means to effect relative movement of the gyroscope controller parts for maintaining said craft on said ground track despite the action of cross winds and the like.

3. Steering apparatus for a dirigible craft, comprising: a directional gyroscope; a servomotor adapted to operate a control surface of said craft; a controller operated from a normal position by said gyroscope; a controller operated from a normal position by said servomotor, the relative positions of said controllers from their normal positions controlling said servomotor; means for precessing said gyroscope to effect operation of its controller; a magnetic compass for operating said precessing means to prevent change in course of said craft; a controller operated in proportion to deviation of said craft from a selected ground track; means for severing control of said precessing means from said compass during changes in course; means for operating said precessing means from said ground track controller to change course of said craft an additional controller operated in proportion to deviation of said craft from the selected ground track; and means for directly controlling said servomotor from said additional controller.

4. Automatic steering apparatus for an aircraft comprising: a directional gyroscope; a signal generator means controlled by relative heading of said craft and said gyroscope for controlling the heading of said craft; means for precessing said gyroscope about a vertical axis; a balanceable system including said gyroscope and a magnetic compass for operating said precessing means to align the compass and said gyroscope; craft turn responsive means to sever said balanceable system and precessing means during craft turns; selective means to sever said balanceable system and precessing means; means responsive to the displacement of said craft from a selected ground path; means for connecting the displacement responsive means to said precessing means by said selective means independently of said turn responsive means to precess said gyroscope continuously during turns of the craft initiated from the displacement responsive means whereby the heading of the craft is altered through said gyroscope to reduce the said displacement of said craft from the ground path; and means effective as said selective means is operated to restore the operating relationship of the balanceable system and precessing means for the gyroscope to cause the gyroscope signal generator to be moved toward a non-signal generating position.

5. Apparatus for controlling the flight of an aircraft along a ground path comprising: servo means for controlling craft heading; voltage responsive means for operating said servo means; means for producing a voltage varying in accordance with displacement of said craft from a predetermined ground path defined by radio beams; means driven by said servo means for producing a follow-up voltage; means for controlling said voltage responsive means from said two voltages to normally cause said craft heading to follow said ground path; a directional gyroscope; means for continuously precessing said gyroscope in accordance with said displacement of said craft from said path thereby tending to misalign said craft and gyroscope; means driven by said gyroscope in proportion to the misalignment of the craft and gyroscope for producing a third voltage; and means for combining said third voltage with said two voltages whereby said precessed gyroscope supplies a signal tending to alter the heading of said craft relative to the direction of the ground path to maintain the craft flight path in the direction of the ground path against the effects of crosswinds or the like.

6. Apparatus for steering an aircraft along a desired ground track comprising: control surface power means for operating a surface on said craft for controlling the direction of flight; a directional gyroscope connected to a signal generator and effecting operation thereof on relative movement of the craft and gyroscope; means connecting said signal generator and power means to effect operation of the power means; an electric motor on said gyroscope for effecting precession thereof to cause further operation of said signal generator; a balanceable voltage means; selective means for connecting said electric motor to said balanceable voltage means; a magnetic compass; operating connections from said gyroscope and compass to said balanceable voltage means to cause unbalance thereof on change in relative position of said gyroscope and compass, for stabilizing craft heading; means to guide said craft onto said ground track comprising adjustable voltage means operated in proportion to the lateral displacement of the craft from the ground track; means connecting said adjustable means to said power means while said selective means severs said balanceable voltage means from said electric motor and also effects nulling of said signal generator whereby the craft is caused to bracket the ground track; and further means for thereafter additionally connecting said adjustable voltage means to said precessing means as well as to said power means while continuing the severance of said balanceable means from said precessing means such precessing of the gyroscope at this time compensating for effects of cross winds or the like on said craft.

References Cited in the file of this patent

UNITED STATES PATENTS

| | | |
|---|---|---|
| 1,896,805 | Sperry et al. | Feb. 7, 1933 |
| 1,958,258 | Alexanderson | May 8, 1934 |
| 1,982,702 | Sperry | Dec. 4, 1934 |
| 2,357,319 | Esval et al. | Sept. 5, 1944 |
| 2,415,429 | Kellogg et al. | Feb. 11, 1947 |
| 2,419,970 | Roe et al. | May 6, 1947 |
| 2,423,337 | Moseley | July 1, 1947 |
| 2,464,629 | Young | Mar. 15, 1949 |
| 2,471,821 | Kutzler et al. | May 31, 1949 |
| 2,512,902 | Rossire | June 27, 1950 |
| 2,524,756 | Braddon et al. | Oct. 10, 1950 |
| 2,539,411 | Esval et al. | Jan. 30, 1951 |
| 2,539,482 | Rothschild | Jan. 30, 1951 |
| 2,570,905 | Young et al. | Oct. 9, 1951 |
| 2,589,834 | MacCallum | Mar. 18, 1952 |